Jan. 28, 1969 JEAN-PIERRE VASSEUR 3,424,986

PULSE FREQUENCY DIVIDER

Filed June 9, 1966 Sheet 1 of 4

United States Patent Office 3,424,986

Patented Jan. 28, 1969

3,424,986

PULSE FREQUENCY DIVIDER

Jean-Pierre Vasseur, Paris, France, assignor to CSF—Compagnie Generale de Telegraphie Sans Fil, a corporation of France Filed June 9, 1966, Ser. No. 556,418
Claims priority, application France, June 28, 1965, 22,514
U.S. Cl. 328—48 6 Claims
Int. Cl. H03k 21/32

ABSTRACT OF THE DISCLOSURE

A device capable of deriving, from recurrent pulses having a repetition frequency F, recurrent pulses at a frequency $F/N$, N being a predetermined integer, comprises a first cascade binary counter, displaying the number N. A second counter counts the pulses at frequency F. A comparator connected to the two counters, generates a pulse, each time the two counters are in the same state, and resets to zero said second counter.

For certain applications it is necessary to divide the frequency F, at which pulses are generated, by a given number N, to obtain pulses at a frequency $f=F/N$.

It is an object of this invention to provide such an arrangement.

According to the invention there is provided an arrangement for providing a frequency $f=F/N$, N being an integer, comprising: a first counter; means for displaying on said counter said integer N; a source for generating pulses with a recurrence frequency equal to F; a second counter for counting said pulses; means for comparing the numbers respectively displayed by said first and second counters for generating a signal upon said compared numbers being equal; and means for resetting to zero said second counter.

The invention will be further described with reference to the accompanying drawings, in which.

The arrangement of the invention comprises two parts:

(a) a display system;

(b) a counting system.

The two systems will be described in turn:

(a) The display system comprises a slow pulse counting device R2 and a decimal counter CD, which both count the pulses of a pulse generator GI2. This generator is started by means of a switch 1. By slow pulses are meant pulses having a repetition frequency of say $10^4$ to $10^6$/cycles per second. It is stopped by a display device AN of any known type and is manually adjustable. The device AN displays the value N, defined above as the ratio $F/f$. Once value N has been displayed, the operator starts the generator GI2. Display device AN is arranged for stopping the pulse generator once the counter CD has counted N pulses.

At this instant, the device R2 has also counted N pulses.

(b) The counting system comprises a first pulse generator GI1 producing pulses with the frequency F. A fast device R1 counts these pulses. By "fast pulses" are meant pulses having a repetition frequency for example, equal to $10^7$ to $10^9$ cycles per second. A comparator C of any suitable known type has its two inputs respectively connected to devices R1 and R2 and delivers a signal every time the state of device R1 coincides with that of register R2, that is, every time device R1 has counted N pulses. Comparator C supplies then a signal which has therefore the frequency $F/N$. This signal resets device R1 to zero.

Figure 2:
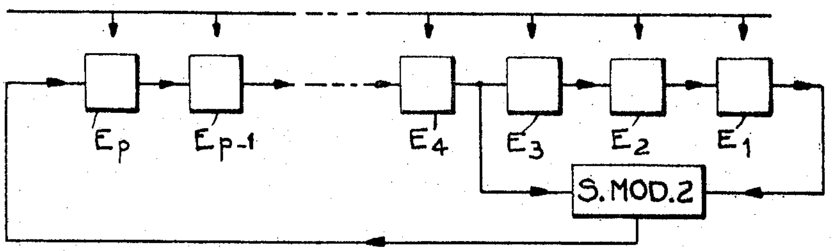
FIGURE 2 shows a block diagram of a shift register used in the arrangement of FIGURE 1.

FIGURE 2 shows in block diagram form an embodiment of binary cascade counter which may be used as devices R1 or R2.

This counter P binary stages, respectively numbered $E_P \ldots E_4, E_3, E_2, E_1$, to which pulses to be counted are applied. Such counters are provided with a modulo 2 feedback loop as described in the book "Error correcting codes", by W. W. Peterson.

The period of the counter can thus reach a maximum value $2^P-1$, since all stages are reset at zero for $2^P$.

Figure 3:
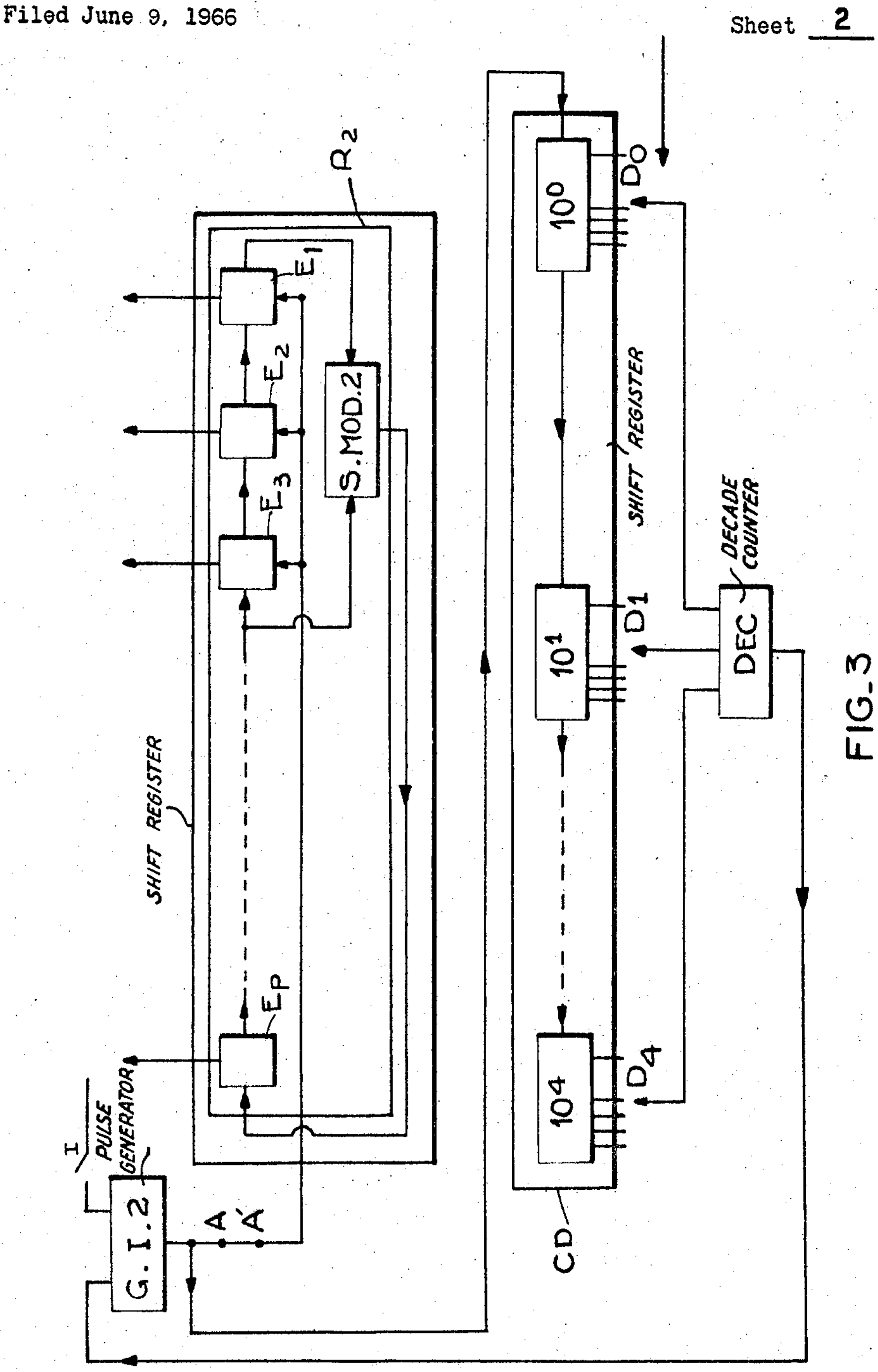
FIGURE 3 is an embodiment of the display system of the arrangement of FIGURE 1.

FIGURE 3 shows an embodiment of the display device CD. The counter R2 is also shown in FIGURE 3. The decimal counter CD comprises for example four stages, corresponding, respectively to $10^4, 10^3 \ldots 10^0$.

Figure 1:
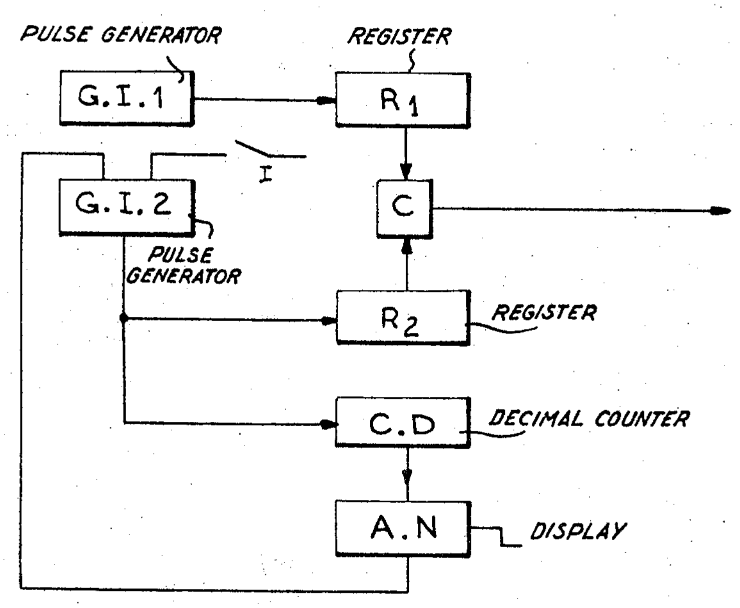
FIGURE 1 shows a block diagram of the arrangement according to the invention.

The stages of the decimal counter are connected through respective 10-position switches $D_{10} \ldots D_1, D_0$, whose assembly is shown in FIGURE 1 as A.N., to a decoding device DEC. The latter produces a signal, when the counter CD has reached the number displayed by the preadjusted switch positions. The decoding system may be, for example, an AND-circuit which produces a pulse when each stage of the decimal counter displays the digit corresponding to the position of the associated switch.

The output of the circuit DEC is connected to a disabling input of the pulse generator G12.

The operation of system is as follows: The assembly of switches $D_1 \ldots D_4$, displays the figure N. The switch 1 starts the generator GI2. The same sends pulses to the counters CD and R2. When the counter CD has counted N pulses, the device DEC stops the generator GI2. The number N is displayed in the counter CD and in the binary cascade counter R2 until the operator selects another number N1.

Figure 4:
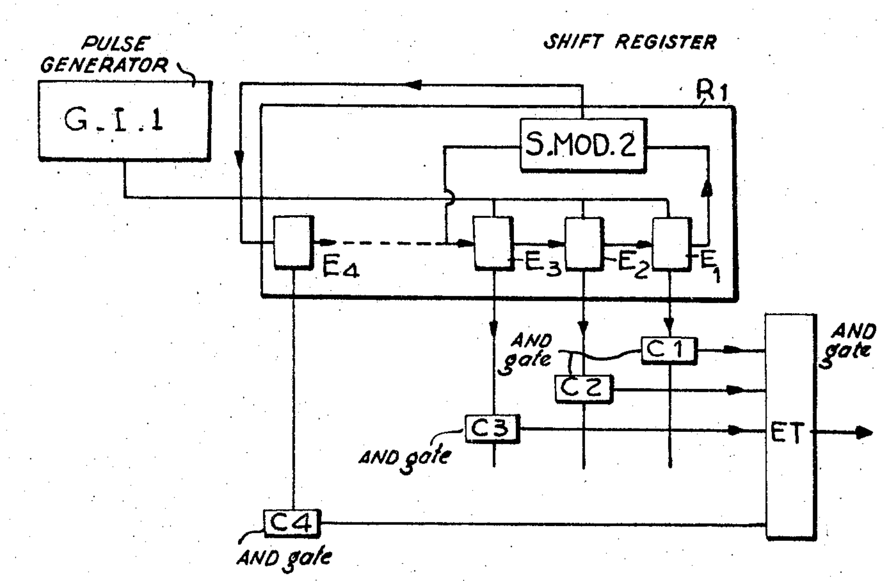
FIGURE 4 is an embodiment of the counting system of the arrangement of FIGURE 1.

FIGURE 4 shows one embodiment of the counting system.

A pulse generator GI1 supplies pulses with recurrence frequency F.

These pulses are counted by the binary cascade counter R1, which is identical to the counter R2. The corresponding stages of these two counters are interconnected by comparator circuit $C_4, C_3, C_2, C_1$, such as AND-gates, each of which produces a pulse when the corresponding stages of counters R1 and R2 are in the same state. These pulses are transmitted to an AND-circuit ET which supplies a pulse only when all the circuits C1 to C4 supply a pulse simultaneously, that is, when the counters R1 and R2 are in the same state and have, therefore, counted the same number N. Circuit ET supplies therefore a pulse for every N pulses of the generator GI1.

Figure 5:
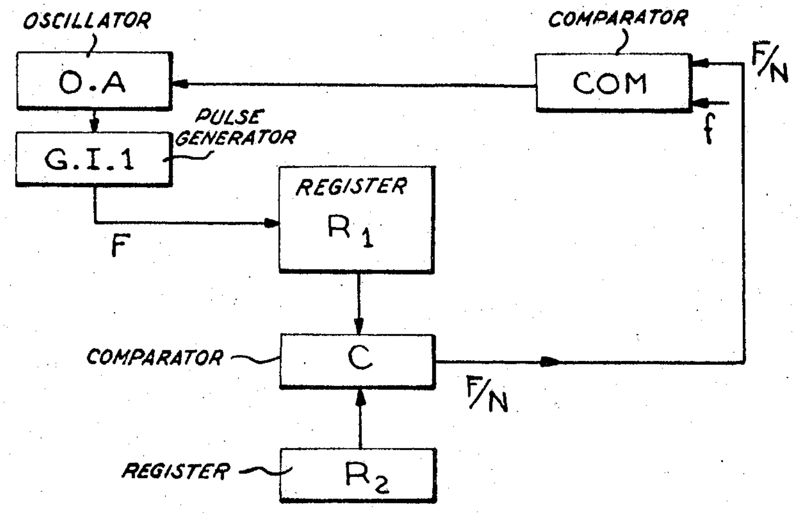
FIGURES 5 and 6 are two examples of applications.

Such a device may be used, for example, for stabilizing an oscillator which in fact operates as a frequency multiplier. The oscillator OA shown in FIGURE 5, must operate at the controlled frequency F, it controls a pulse generator GI1 operating at the same frequency. Pulses with the frequency F/N are derived from comparator C, as in FIGURE 1.

A frequency comparator COM receives these pulses and pulses at a reference frequency $f$ and supplies a control signal to oscillator OA which signal acts on the frequency thereof until $$f-\frac{F}{N}=0$$

The oscillator OA is thus controlled by a comparison between a sub-multiple $F/N$ of its frequency F and a reference frequency $f$. Its frequency is therefore $F=Nf$.

Figure 6:
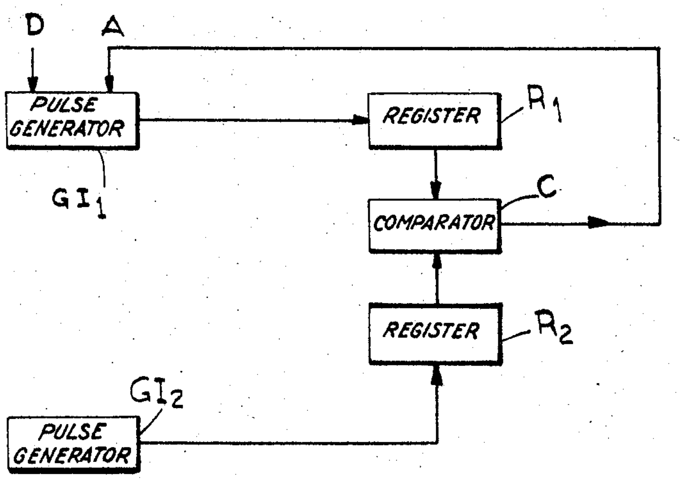

In another application, shown in FIGURE 6, the generator GI1 has a starting input D and a stopping input A, connected to the output of camparator C of FIGURE 1. In the state of rest, the counter R2 displays N and the counter R1 zero. A starting pulse applied to GI1 starts the count. The output pulse of comparator C is applied to the input A of oscillator GI1 which stops after supplying N pulses. The starting and stopping pulses are thus separated by a time $N/F$. Such a device may be used for measuring time intervals and its precision will be all the greater as F is larger.

Of course the invention is not limited to the embodiment described and shown which were given solely by way of example.

What is claimed is:

1. An arrangement for providing a frequency $f=F/N$, N being an integer, comprising: a first counter; means for displaying on said counter said integer N; a source for generating pulses with a recurrence frequency equal to F; a second counter for counting said pulses; means for comparing the numbers respectively displayed by said first and second counters and for generating a signal upon said compared numbers being equal; and means for resetting to zero said second counter.

2. An arrangement as claimed in claim 1, wherein said counters are binary cascade counters, having P stages, respectively arranged for counting until $2^P-1$, P being the number of said stages of said counters.

3. An arrangement as claimed in claim 2 wherein said comparator means comprises first AND-gates having inputs, respectively interconnecting the respective stages of the same order of said counters, and outputs and a further AND-gate having P inputs respectively connected to said outputs.

4. An arrangement as claimed in claim 1, wherein said means for displaying, on said first counter, said number N comprises a further pulse source, for generating further recurrent pulses, feeding said first counter a decimal counter also fed by said source, for counting said further recurrent pulses and means for stopping said further pulse source, upon said decimal counter displaying said number N.

5. An arrangement as claimed in claim 1, further comprising further comparator means having one input connected to said comparing means and having a further input for receiving a reference frequency signal and output, an oscillator having a control input, connected to said last mentioned output, and an output for controlling said pulse generating source.

6. An arrangement as claimed in claim 1, wherein said pulse generating source has a starting and a stopping input, said stopping input being controlled by further means in said comparing means.

References Cited

UNITED STATES PATENTS

| | | | |
|---|---|---|---|
| 2,852,671 | 9/1958 | Cohen | 328—39 X |
| 3,044,065 | 7/1962 | Barney et al. | 328—42 X |
| 3,096,483 | 7/1963 | Ransom | 328—48 |
| 3,137,818 | 6/1964 | Clapper | 328—48 X |

JOHN S. HEYMAN, *Primary Examiner.*

U.S. Cl. X. R.

235—92; 328—39; 45